United States Patent [19]

Yashiro

[11] Patent Number: 5,580,696
[45] Date of Patent: Dec. 3, 1996

[54] OPTICAL RECORDING MEDIUM AND METHOD OF PRODUCING THE SAME

[75] Inventor: Toru Yashiro, Kamakura, Japan

[73] Assignees: Ricoh Company, Ltd., Tokyo; Yamada Chemical Co., Ltd., Kyoto, both of Japan

[21] Appl. No.: 424,099

[22] Filed: Apr. 19, 1995

[30] Foreign Application Priority Data

Apr. 20, 1994 [JP] Japan .................................. 6-104495
Aug. 16, 1994 [JP] Japan .................................. 6-214246

[51] Int. Cl.$^6$ .......................... G11B 7/24; G01D 9/00; G03C 1/72
[52] U.S. Cl. .................. 430/270.17; 430/445; 430/541; 346/135.1
[58] Field of Search .......................... 430/270.17, 495, 430/945; 346/135.1; 427/294

[56] References Cited

U.S. PATENT DOCUMENTS

| | | | |
|---|---|---|---|
| 4,859,569 | 8/1989 | Hiron et al. ............................ | 430/495 |
| 5,169,745 | 12/1992 | Yashiro et al. . | |
| 5,238,722 | 8/1993 | Yashiro et al. . | |
| 5,252,372 | 10/1993 | Yashiro et al. . | |
| 5,270,463 | 12/1993 | Itoh et al. . | |
| 5,296,034 | 3/1994 | Dietz et al. ............................ | 430/139 |

Primary Examiner—Thorl Chea
Attorney, Agent, or Firm—Oblon, Spivak, McClelland, Maier & Neustadt, P.C.

[57] ABSTRACT

An optical recording medium has a substrate, and a right absorbing layer serving as a recording layer formed of the substrate. The light absorbing layer contains a metallophthalocyanine compound of formula (I):

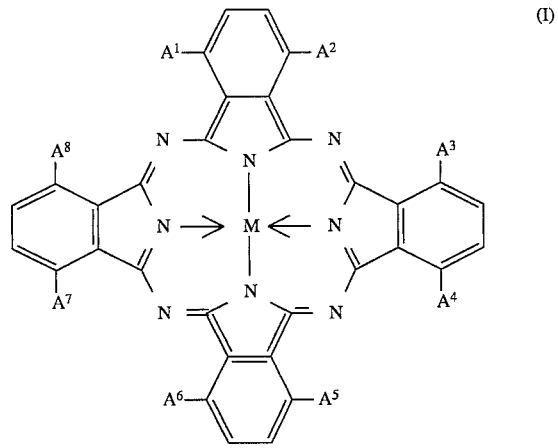

wherein M is Mn, Fe, Co, Zn or Cd; and either $A^1$ or $A^2$, either $A^3$ or $A^4$, either $A^5$ or $A^6$, and either $A^7$ or $A^8$ is —OR group or —SR group in which R is a group including —N= or —N<, and the other is hydrogen.

13 Claims, 2 Drawing Sheets

OPTICAL RECORDING MEDIUM AND METHOD OF PRODUCING THE SAME

BACKGROUND OF THE INVENTION

1. Field of the Invention

The present invention relates to an optical recording medium and a method of producing the optical recording medium.

2. Discussion of Background

Recently overwrite type CDs (Compact Disks) have been actively developed. This is because the overwrite type CDs, unlike conventional CD, have the features that the user can record information therein as desired, and the recorded information can be reproduced therefrom by use of a commercially available CD player since the signals recorded in the overwrite type CDs satisfy the conventional CD standards for signals for recording.

An example of such an overwrite type CD is proposed in Japanese Laid-Open Patent Application 2-42652. This overwrite type CD comprises a substrate, a light absorbing layer which is provided by the spin coating of a dye on the substrate, and a metal reflection layer provided on the back side of the substrate opposite to the light absorbing layer.

Another example of such an overwrite type CD is proposed in Japanese Laid-Open Patent Application 2-132656. This overwrite type CD comprises a light absorbing layer comprising a dye and is caused to satisfy the conventional CD standards for signals for recording by appropriately selecting the double refractive index and thickness of the light absorbing layer.

The overwrite type CDs using dyes as disclosed in Japanese Laid-Open Patent Applications 2-42652 and 2-132656, however, do not have a sufficient light resistance for use in practice. To be more specific, these overwrite type CDs have the shortcoming that the signal characteristics thereof change, when exposed to sun light for an extended period of time, to such an extent that they cannot satisfy the conventional CD standards. This is because the properties of the dye materials used in the light absorbing layers thereof, in particular, conventional cyanine dyes, are changed when exposed to light.

In order to control such changes in the properties of the dye materials, it has been proposed to contain a light stabilizer in the light absorbing layer as disclosed in Japanese Laid-Open Patent Application 63-159090. However, when the content of the light stabilizer in the light absorbing layer is small, for instance, less than 20 wt. %, a sufficient light resistance for use in practice cannot be obtained, while when the content of the light stabilizer in the light absorbing layer is large, for instance, 20 wt. % or more, the optical and/or thermal characteristics of the light absorbing layer are changed and the signal recording and reproduction characteristics of the light absorbing layer deteriorate in many respects.

As another means for improving the light resistance of the light absorbing layer, it is proposed as disclosed in Japanese Laid-Open Patent Applications 58-183296 and 58-37851 that a phthalocyanine compound, which is a dye with high light resistance, be employed as a material for the light absorbing layer. However, it is difficult to obtain the optical characteristics required for the light absorbing layer, in particular, high refractive index, by use of such a phthalocyanine compound.

This is because the optical characteristics of the light absorbing layer depend upon the absorptivity coefficient of the layer (i.e. the absorbance per unit thickness of the layer) at a wavelength close to the wavelength of a laser beam used for recording and reproducing, so that there is required a sufficiently large absorptivity coefficient to satisfy the optical characteristics required for the overwrite type CD. However, a film layer of such a phthalocyanine compound has an absorptivity coefficient which is smaller than that of a film layer of the conventional cyanine dye. To be more specific, the absorptivity coefficient of the film layer of the phthalocyanine compound is about ⅓ to ½ that of the film layer of the cyanine dye.

SUMMARY OF THE INVENTION

It is therefore a first object of the present invention to provide an optical recording medium comprising a light absorbing layer which has a sufficiently high light resistance and improved optical characteristics.

A second object of the present invention is to provide a method of producing the above-mentioned optical recording medium.

The first object of the present invention can be achieved by an optical recording medium which comprises a substrate and a light absorbing layer formed on the substrate, the light absorbing layer comprising a metallo-phthalocyanine compound of formula (I):

(I)

wherein M is Mn, Fe, Co, Zn or Cd; and either $A^1$ or $A^2$, either $A^3$ or $A^4$, either $A^5$ or $A^6$, and either $A^7$ or $A^8$ is —OR group or —SR group in which R is a group including —N= or —N<, and the other is hydrogen.

In the above-mentioned optical recording medium, it is preferable that a nitrogen atom included in the group R in the phthalocyanine compound of formula (I) be in a heterocyclic ring.

Furthermore, in the aforementioned optical recording medium of the present invention, it is preferable that the light absorbing layer exhibit a maximum light absorption peak (λmax) in a wavelength range of 710 to 750 nm.

The second object of the present invention can be achieved by a method for fabricating an optical recording medium comprising a substrate and a light absorbing layer formed on the substrate, the light absorbing layer comprising a metallo-phthalocyanine compound of formula (I), which method comprises the step of providing the light absorbing layer on the substrate by coating of the metallo-phthalocyanine compound of formula (I):

(I)

wherein M is Mn, Fe, Co, Zn or Cd; and either $A^1$ or $A^2$, either $A^3$ or $A^4$, either $A^5$ or $A^6$, and either $A^7$ or $A^8$ is —OR group or —SR group in which R is a group including —N= or —N<, and the other is hydrogen.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The inventors of the present invention have completed the present invention based on the knowledge that the reasons why the absorptivity coefficient of a film layer of a phthalocyanine compound, serving as a light absorbing layer used in the conventional optical recording medium, is small are that the molecule of the phthalocyanine compound has a plane structure, so that the molecules of the phthalocyanine compound tend to be associated, and when the molecules of the phthalocyanine compound are associated, the light absorption spectrum of the phthalocyanine compound becomes broad because of the mutual interaction of the molecules.

Furthermore, it has also been found that it is preferable that a maximum light absorption peak ($\lambda$max) of the light absorbing layer comprising a phthalocyanine compound appear in a wavelength range of 710 to 750 nm in order to obtain a proper double refractive index at a wavelength of a laser beam, that is, in a range of 760 to 800 nm.

The optical recording medium according to the present invention comprises a substrate and a light absorbing layer formed thereon, which comprises as the main component a metallo-phthalocyanine compound of the previously mentioned formula (I). In the present invention, the association of the molecules of the phthalocyanine compound can be inhibited when the light absorbing layer comprising the metallo-phthalocyanine compound of formula (I) is formed in a thin film on the substrate. Accordingly, the light absorption spectrum of the light absorbing layer for use in the present invention does not become broad, and the proper double refractive index of the light absorbing layer can be obtained at a wavelength close to the wavelength of the laser beam.

In the metallo-phthalocyanine compound of formula (I), a nitrogen-containing group R tends to be coordinated to the central metal element M, so that such a group enters between the molecules of the metallo-phthalocyanine compound, thereby inhibiting the association of the molecules thereof.

As previously mentioned, it has been confirmed that it is preferable that a maximum light absorption peak ($\lambda$max) of a light absorbing layer comprising the metallo-phthalocyanine compound appear in a wavelength range of 710 to 750 nm in order to obtain a proper double refractive index of the light absorbing layer at a wavelength of the laser beam. In the present invention, the maximum light absorption peak of the light absorbing layer can substantially appear in a wavelength range of 710 to 750 nm by the influence of OR group or SR group which is situated at one of the $\alpha$-positions (either $A^1$ or $A^2$, either $A^3$ or $A^4$, either $A^5$ or $A^6$, and either $A^7$ or $A^8$) in each benzene ring of the phthalocyanine skeleton.

As the group R containing —N= or —N< for use in the metallo-phthalocyanine compound of formula (I), a group in which a nitrogen atom is included in a heterocyclic ring is particularly preferable from the viewpoints of the association inhibition characteristics and the durability of the obtained light absorbing layer in terms of the heat and light resistance.

Specific examples of the group R for use in the formula (I) are as follows:

wherein $R^1$ and $R^8$ each is a bivalent aliphatic, aromatic or alicyclic hydrocarbon group; $R^2$, $R^3$, $R^4$, $R^5$, $R^6$ and $R^7$ each is a monovalent aliphatic, aromatic or alicyclic hydrocarbon group, an alkoxyl group, an alkylthio group, hydroxyl group or hydrogen, and $R^2$ and $R^3$ may form a ring in combination with nitrogen atom and $R^5$ and $R^6$ may form a ring in combination with carbon atom; and Z is a nitrogen-containing heterocyclic ring.

In the metallo-phthalocyanine compound of formula (I), Mn, Fe, Co, Zn and Cd can be employed as the central metal element M. The previously mentioned nitrogen-containing group R can easily be coordinated to such central metals, thereby effectively inhibiting the association of the molecules.

In addition to the previously mentioned OR group and SR group, other groups such as a halogen atom, nitro group, an alkyl group, an alkoxyl group and alkylthio group may be added to each benzene ring of the phthalocyanine skeleton to control the light absorption wavelength of the light absorbing layer and improve the solubility of the metallo-phthalocyanine compound in a solvent in the formation of a coating liquid for the light absorbing layer.

As the materials for the light absorbing layer, not only the above-mentioned phthalocyanine compound, but also dyes which are conventionally employed as recording materials for conventional information recording media can be employed in the form of a mixture with the metallo-phthalocyanine compound of formula (I).

Examples of such dyes include cyanine dyes, pyrylium - thiopyrylium dyes, azulenium dyes, squarylium dyes, metal complex salt dyes such as Ni and Cr complex salt dyes, naphthoquinone - anthraquinone dyes, indophenol dyes, indoaniline dyes, triphenylmethane dyes, triarylmethane dyes, aminium - diinmonium dyes, and nitroso compounds.

When necessary, other third components such as a binder and a stabilizer may be contained in the light absorbing layer.

It is preferable that the thickness of the light absorbing layer be in a range of 100 to 5000 Å, more preferably in a range of 500 to 3000 Å. The decrease of recording sensitivity and the decrease of reflectance of the light absorbing layer can be prevented when the thickness of the light absorbing layer is within the above range.

As the substrate for use in the present invention, any materials used for the substrate of conventional information recording media can be employed.

Specific examples of the material for the substrate for use in the present invention include acrylic resin such as polymethyl methacrylate; vinyl chloride resin such as polyvinyl chloride and vinyl chloride copolymer; epoxy resin; polycarbonate resin; amorphous polyolefin; polyester; glass such as soda-lime glass; and ceramics.

In view of the dimensional stability, transparency, and flatness of the substrate, polymethyl methacrylate, polycarbonate resin, epoxy resin, amorphous polyolefin, polyester, and glass are particularly preferable as the materials for the substrate for use in the present invention.

An undercoat layer may be provided between the light absorbing layer and the substrate for improvement of the flatness of the substrate and the adhesion between the substrate and the light absorbing layer, and for prevention of the deterioration of the light absorbing layer.

Examples of the material for the undercoat layer include polymers such as polymethyl methacrylate, acrylic acid - methacrylic acid copolymer, styrene - maleic anhydride copolymer, polyvinyl alcohol, N-methylol-acrylamide, styrene - sulfonic acid copolymer, styrene - vinyltoluene copolymer, chlorosulfonated polyethylene, nitrocellulose, polyvinyl chloride, chlorinated polyolefin, polyester, polyimide, vinyl acetate - vinyl chloride copolymer, ethylene - vinyl acetate copolymer, polyethylene, polypropylene, and polycarbonate; organic materials such as silane coupling agents; and inorganic materials, for example, an inorganic oxide such as $SiO_2$ or $Al_2O_3$ and an inorganic fluoride such as $MgF_2$.

The thickness of such an undercoat layer is preferably in a range of 0.005 to 20 μm, more preferably in a range of 0.01 to 10 μm.

A pre-groove layer for forming therein grooves for tracking and/or address signals may be provided on the substrate or on the undercoat layer.

As the material for the pre-groove layer, a mixture of at least one monomer selected from the group consisting of monoester, diester, triester and tetraester of acrylic acid, or an oligomer thereof, and a photopolymerization initiator may be employed.

On the light absorbing layer, a light reflection layer may be provided to improve the S/N ratio, the reflectance and the recording sensitivity of the recording medium.

As a light reflective material for use in the light reflection layer, materials capable of exhibiting high reflectance with respect to the laser beam are employed. Examples of such materials include metals and metalloids, such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ca, In, Si, Ge, Te, Pb, Po, Sn, and Si.

Of these metals and metalloids, Au, Al and Ag are preferable as the materials for the light reflection layer. These materials may be used alone or in combination, or in the form of alloys.

The light reflection layer generally has a thickness of 100 to 3000 Å.

Such a light reflection layer may be interposed between the substrate and the light absorbing layer serving as the recording layer. In this case, recording of information and reproduction of the recorded information are carried out on the side of the light absorbing layer, which is opposite to the substrate.

A protective layer may be provided on the light absorbing layer or the light reflection layer in order to physically and chemically protect the light absorbing layer or the light reflection layer.

Such a protective layer may also be provided on the side of the substrate on which the recording layer is not provided in order to improve the resistance to scratches and the resistance to humidity of the recording medium.

As the material for the protective layer, for instance, inorganic materials such as SiO, $SiO_2$, $MgF_2$ and $SnO_2$; and resins such as a thermoplastic resin, a thermosetting resin and an ultraviolet curing resin can be employed.

The protective layer generally has a thickness of 500 Å to 50 μm.

The method for producing the optical recording medium of the present invention will now be explained.

To produce an optical recording medium according to the present invention, a light absorbing layer comprising as the main component the metallo-phthalocyanine compound of formula (I) is directly provided on a substrate by coating method, on which substrate the information pits and/or guide grooves have been previously formed. Alternatively, other layers may be interposed between the light absorbing layer and the substrate.

Furthermore, a light reflection layer may be provided on the light absorbing layer directly or via other layers by vacuum-deposition, and a protective layer may be provided on the thus formed light reflection layer.

The method for fabricating the optical recording medium according to the present invention will be explained in detail step by step.

[Formation of light absorbing layer]

The film formation of a light absorbing layer comprising as the main component the metallo-phthalocyanine compound of formula (I) is carried out by coating method, so that the light absorbing layer is directly or via other layers provided on a substrate on which the information pits and/or guide grooves have been previously formed. To be more specific, a coating liquid may be prepared by dissolving the previously mentioned metallo-phthalocyanine compound of formula (I) in an appropriate solvent, and the coating liquid thus prepared may be applied to the substrate, so that the light absorbing layer is provided on the substrate.

As the solvent used in the preparation of the abovementioned coating liquid, conventional organic solvents such as alcohol, cellosolve, halogenated carbon, ketone and ether can be employed.

The light absorbing layer can be formed, for example, by the evaporation method, LB method, and spin coating method. Of these methods, the spin coating method is most preferable because the thickness of the light absorbing layer can be controlled as desired by adjusting the concentration and viscosity of the components for the formation of the light absorbing layer, and the drying speed of the solvent used for formation of the light absorbing layer.

In the case where the undercoat layer is provided between the substrate and the light absorbing layer, a coating liquid for the undercoat layer is prepared by dissolving or dispersing any of the previously mentioned materials for the undercoat layer in a proper solvent, and the coating liquid thus prepared is coated on the substrate by spin coating, dip coating or extrusion coating.

[Formation of light reflection layer]

The light reflection layer may be formed on the light absorbing layer directly or via other layers by vacuum deposition. To be more specific, any of the previously mentioned light reflective materials may be deposited on the light absorbing layer by evaporation, sputtering or ion-plating.

[Formation of protective layer]

According to the present invention, the protective layer may be provided on the light reflection layer. To provide the protective layer, any of the previously mentioned inorganic materials and resins may be applied to the light reflection layer by vacuum-deposition or coating method. In particular, it is preferable that the UV-curing resin be applied to the light reflection layer by spin coating and cured by ultraviolet-light irradiation.

Other features of this invention will become apparent in the course of the following description of exemplary embodiments, which are given for illustration of the invention and are not intended to be limiting thereof.

EXAMPLE 1

Tetraalkoxy-Zn-phthalocyanine compound (A) as shown in Table 1 was dissolved in chloroform to prepare a coating liquid for the light absorbing layer.

The coating liquid thus prepared was coated on a disk-shaped glass substrate with a diameter of 120 mm and a thickness of 1.2 mm by spin coating, whereby a light absorbing layer was provided on the glass substrate, and an optical recording medium No. 1 of the present invention was fabricated.

Figure 1:
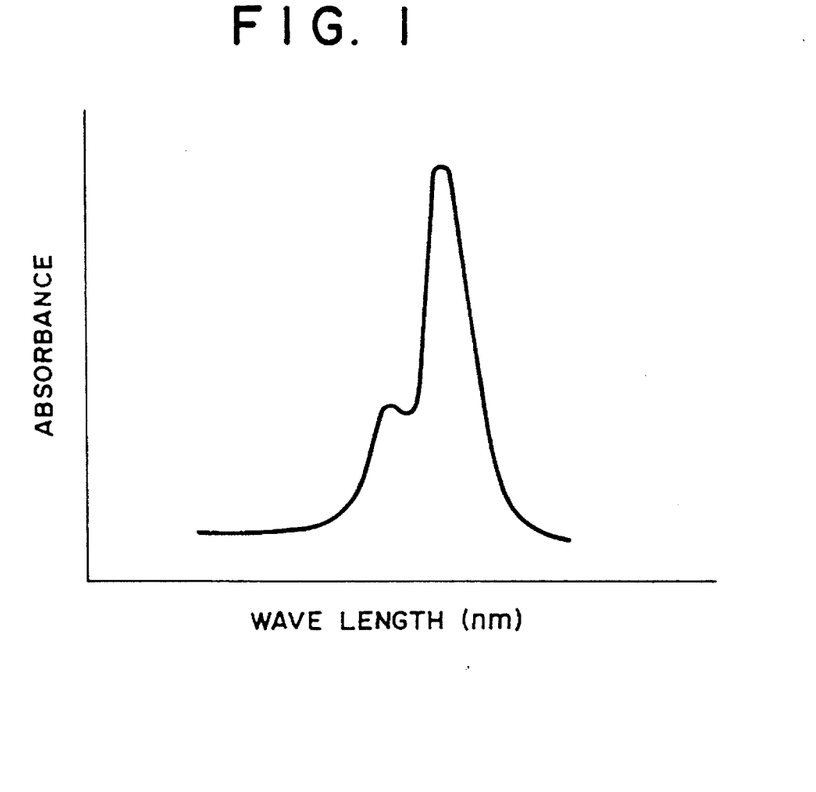
FIG. 1 is a light absorption spectrum of the light absorbing layer obtained in Example 1, in which the molecules are not associated.

FIG. 1 shows a light absorbing spectrum of the light absorbing layer of the optical recording medium No. 1, which indicates that the absorption peak on the right side, which is a longer wavelength side, is higher than the absorption peak on the left side, which is a shorter wavelength side.

Comparative Example 1

The procedure for fabricating the optical recording medium No. 1 of the present invention in Example 1 was repeated except that the metallo-phthalocyanine compound (A) for use in the light absorbing layer coating liquid employed in Example 1 was replaced by tetraalkyl-Zn-phthalocyanine compound (F) as shown in Table 1, whereby a comparative optical recording medium No. 1 was fabricated.

Figure 2:
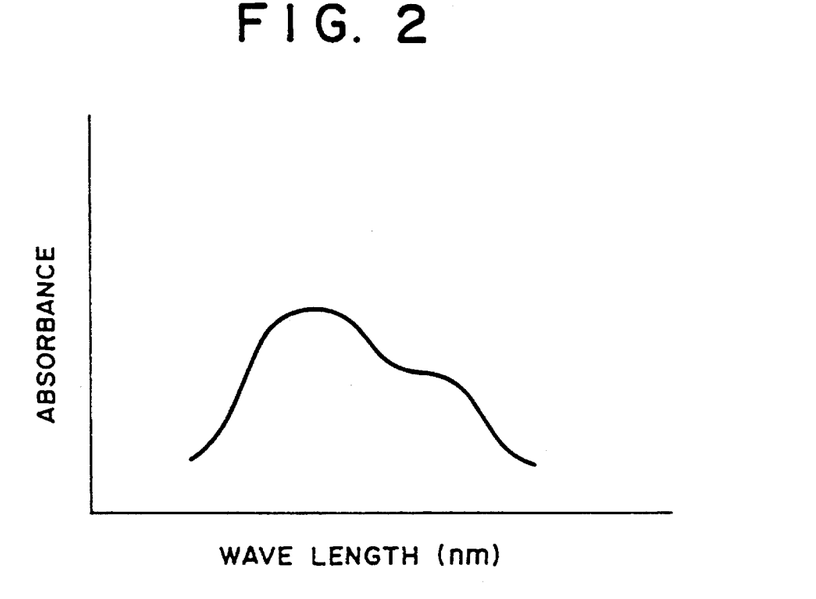
FIG. 2 is a light absorption spectrum of the light absorbing layer obtained in Comparative Example 1, in which the molecules are associated.

FIG. 2 shows a light absorbing spectrum of the light absorbing layer of the comparative optical recording medium No. 1, which indicates that the absorption peak on the left side, which is a shorter wavelength side, is higher than the absorption peak on the right side, which is a longer wavelength side.

EXAMPLES 2 TO 5

The procedure for fabricating the optical recording medium No. 1 of the present invention in Example 1 was repeated except that the tetraalkoxy-Zn-phthalocyanine compound (A) for use in the light absorbing layer coating liquid employed in Example 1 was replaced by the respective tetraalkoxy- or tetraalkylthio-metallo-phthalocyanine compounds (B) to (E) as shown in Table 1.

Thus, optical recording media Nos. 2 to 5 according to the present invention were fabricated.

Comparative Examples 2 to 4

The procedure for fabricating the optical recording medium No. 1 of the present invention in Example 1 was repeated except that the tetraalkoxy-Zn-phthalocyanine compound (A) for use in the light absorbing layer coating liquid employed in Example 1 was replaced by the respective metallo-phthalocyanine compounds (G) to (I) as shown in Table 1.

Thus, comparative optical recording media Nos. 2 to 4 were fabricated.

Then, a maximum light absorption peak ($\lambda$max) of the light absorbing layer of each of the optical recording media obtained in Examples 1 to 5 and Comparative Examples 1 to 4 was measured, and the absorptivity coefficient of the light absorbing layer at the maximum light absorption peak was obtained. In such measurement, the thickness of the light absorbing layer was measured by using a commercially available feeler-type thickness meter "DEKTAK IIA" (Trademark), made by Sloan Co., Ltd. The results are shown in Table 1.

In addition, using the optical recording media No. 1 and No. 5 according to the present invention obtained in Examples 1 and 5, and the comparative optical recording media No. 1, No. 3 and No. 4 obtained in Comparative Examples 1, 3 and 4, the refractive index of each light absorbing layer at a wavelength close to the wavelength of a semiconductor laser beam was calculated from the reflectance of each light absorbing layer.

Figure 3:
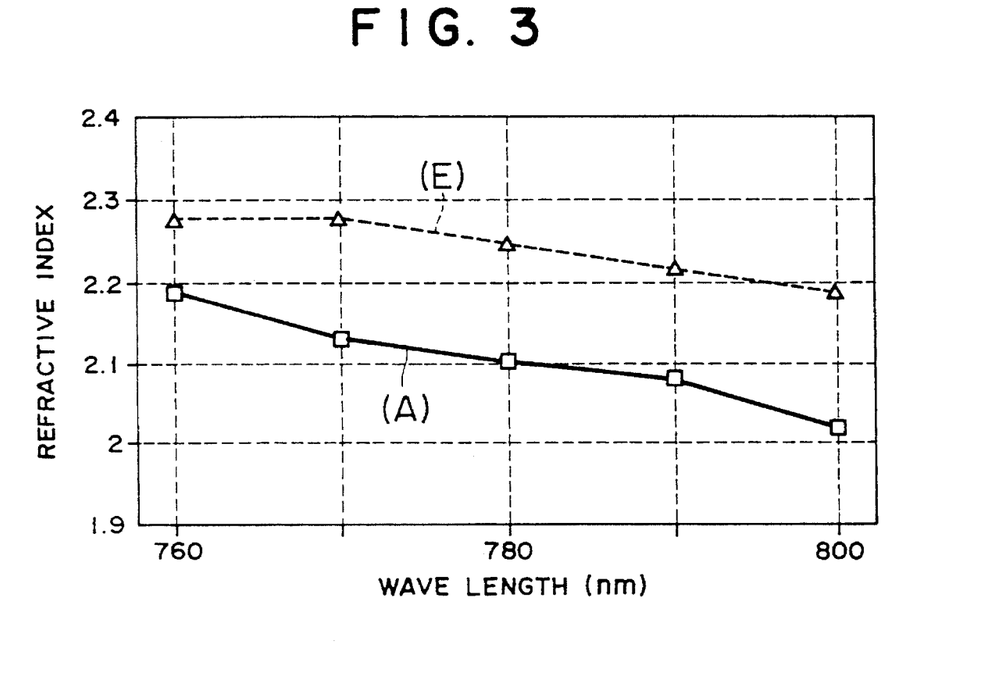
FIG. 3 is a graph which shows the relationship between the wavelength of the applied light and the refractive index of the light absorbing layers obtained in Examples 1 and 5.

FIG. 3 shows the relationship between the refractive index of the light absorbing layers of the optical recording media No. 1 and No. 5 according to the present invention, and the wavelength of the applied semiconductor laser beam in a range of 760 to 800 nm.

Figure 4:
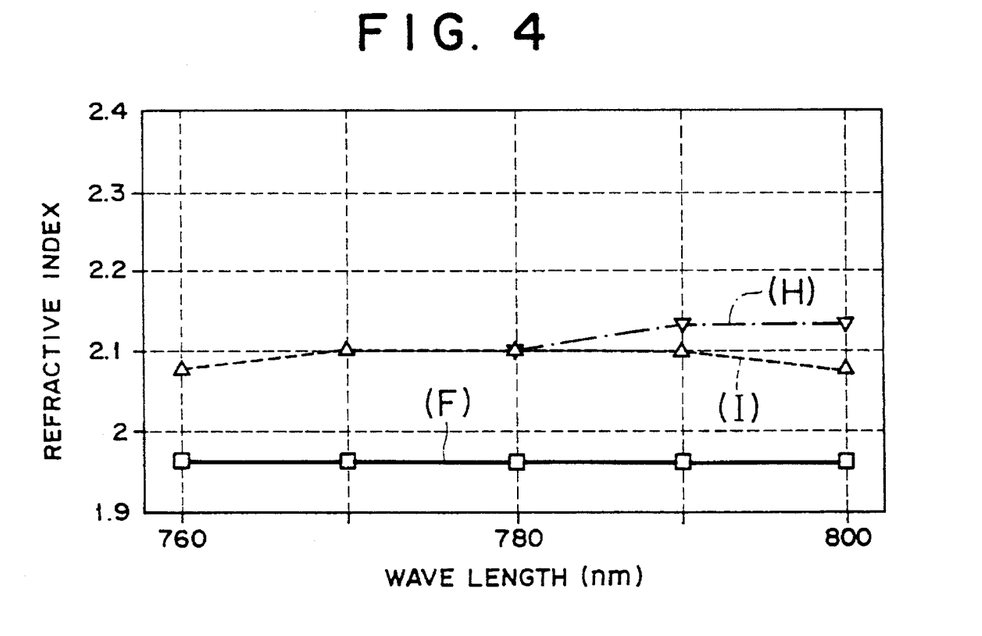
FIG. 4 is a graph which shows the relationship between the wavelength of the applied light and the refractive index of the light absorbing layers obtained in Comparative Examples 1, 3 and 4.

FIG. 4 shows the relationship between the refractive index of the light absorbing layers of the comparative optical recording media No. 1, No. 3 and No. 4, and the wavelength of the applied semiconductor laser beam in a range of 760 to 800 nm.

TABLE 1

| Example No. | Phthalocyanine Compound No. | Central Metal | Position of Substituent (in a benzene ring) | Substituent | Maximum Light Absorption Peak [λmax] (nm) | Absorptivity Coefficient of Light Absorbing Layer (× $10^4$/cm) |
|---|---|---|---|---|---|---|
| Ex. 1 | (A) | Zn | α-position | −O−(benzene ring with CH$_3$ and CH$_2$−N-piperidine) | 710 | 28–35 |
| Ex. 2 | (B) | Cd | α-position | −O−(benzene ring with CH$_3$ and CH$_2$−N-piperidine) | 715 | 25 |
| Ex. 3 | (C) | Zn | α-position | −S−(benzene ring with CH$_3$ and CH$_2$−N-piperidine) | 725 | 28 |
| Ex. 4 | (D) | Zn | α-position | −S−(benzene ring fused with imidazole NH) | 730 | 25–30 |
| Ex. 5 | (E) | Zn | α-position | −O−CH$_2$CH$_2$−(C(CH$_3$)=C(S−)−N=thiazole) | 719 | 28 |
| Comp. Ex. 1 | (F) | Zn | β-position | −C(CH$_3$)$_3$ | 635 | 14–18 |
| Comp. Ex. 2 | (G) | Zn | β-position | −O−(benzene ring with −CH(CH$_2$CH$_3$)(CH$_3$)) | 630 | 14–18 |
| Comp. Ex. 3 | (H) | Zn | α-position | −S−(benzene ring with CH$_3$) | 730 | 18–21 |

TABLE 1-continued

| Example No. | Phthalocyanine Compound No. | Central Metal | Position of Substituent (in a benzene ring) | Substituent | Maximum Light Absorption Peak [λmax] (nm) | Absorptivity Coefficient of Light Absorbing Layer (× 10⁴/cm) |
|---|---|---|---|---|---|---|
| Comp. Ex. 4 | (I) | Cu | α-position | —O—⟨C₆H₄⟩—CH₃ with CH₂—N(piperidine) | 715 | 16–18 |

EXAMPLE 6

[Formation of light absorbing layer]

Guide grooves with a depth of about 1200 Å were provided on the surface of a disk-shaped amorphous polyolefin substrate with a diameter of 120 mm and a thickness of 1.2 mm.

The metallo-phthalocyanine compound (E) as shown in Table 1 was dissolved in 1,2-dichloroethane to prepare a coating liquid for the light absorbing layer. The coating liquid thus prepared was coated on the disk-shaped substrate by spin coating, so that a light absorbing layer with a thickness of about 1500 Å was provided on the substrate.

[Formation of light reflection layer]

Au was deposited on the above prepared light absorbing layer by sputtering, so that a light reflection layer with a thickness of about 800 Å was provided on the light absorbing layer.

[Formation of protective layer]

On the above prepared light reflection layer, a protective layer with a thickness of about 5 μm, comprising an ultraviolet curing resin was provided.

Thus, an optical recording medium No. 6 according to the present invention was fabricated.

EFM signals were recorded in the above prepared optical recording medium No. 6 under the conditions that the wavelength of the signal was 785 nm, the numerical aperture (N.A.) was 0.5, and the recording linear velocity was 1.4 m/sec. The thus recorded signals were reproduced from the optical recording medium.

The evaluation was made in accordance with Red Book of the CD standards, and the results were as follows:

$I_{top}$: 66%

CI error: 220 or less

As can be seen from the results, the CD standards were satisfied.

Comparative Example 5

The procedure for fabricating the optical recording medium No. 6 of the present invention in Example 6 was repeated except that the metallo-phthalocyanine compound (E) for use in the light absorbing layer coating liquid employed in Example 6 was replaced by the metallo-phthalocyanine compound (H) as shown in Table 1.

Thus, a comparative optical recording medium No. 5 was fabricated.

Using the above prepared comparative optical recording medium No. 5, the same recording and reproducing test as conducted in Example 6 was carried out.

The evaluation was made in accordance with Red Book of the CD standards, and the results were as follows:

$I_{top}$: 38%

CI error: 220 or more

As can be seen from the results, the CD standards were not satisfied.

It is confirmed by the results of Examples and Comparative Examples that the optical recording media according to the present invention have the following advantages:

(1) The association of the molecules can be effectively prevented in the light absorbing layer of the optical recording medium according to the present invention when compared with the conventional light absorbing layer, as is apparent from the graphs of FIGS. 1 and 2.

(2) The absorptivity coefficient of the light absorbing layer of the optical recording medium according to the present invention is larger than that of the conventional light absorbing layer. In addition, the light absorbing layer for use in the present invention can exhibit a maximum light absorption peak in a wavelength range of 710 to 750 nm.

(3) The refractive index of the light absorbing layer of the optical recording medium according to the present invention is higher than that of the conventional light absorbing layer at a wavelength close to the wavelength of the semiconductor laser beam.

As previously mentioned, since the light absorbing layer of the optical recording medium according to the present invention comprises the metallo-phthalocyanine compound of formula (I), the association of the molecules of the metallo-phthalocyanine compound can be inhibited in the light absorbing layer, thereby exhibiting the excellent optical properties, that is, a proper double refractive index at the wavelength of the laser beam in a range of 760 to 800 nm.

When the metallo-phthalocyanine compound of formula (I) for use in the light absorbing layer contains nitrogen atom included in the group R in formula (I), which is in a heterocyclic ring, the association of the molecules of the phthalocyanine compound can be more effectively inhibited, and the durability of the optical recording medium, in terms of the heat resistance and light resistance, can be improved.

It is preferable that the light absorbing layer of the optical recording medium of the present invention exhibit a maximum light absorption peak in a wavelength range of 710 to 750 nm. This is because the proper double refractive index can be surely obtained when the laser beam is applied thereto.

Furthermore, the optical recording medium can be easily fabricated in a stable condition by the fabricating method of the present invention.

Japanese Patent Application No. 6-104495 filed on Apr. 20, 1994, and Japanese Patent Application No. 6-214246 filed on Aug. 16, 1994 are hereby incorporated by reference.

What is claimed is:

1. An optical recording medium comprising a substrate and a light absorbing layer formed on said substrate, said light absorbing layer comprising a metallo-phthalocyanine compound of formula (I):

wherein M is Mn, Fe, Co, Zn or Cd; and one of the substituents $A^1$ and $A^2$, one of $A^3$ and $A^4$, one of $A^5$ and $A^6$, and one of $A^7$ and $A^8$ is an —OR group or an —SR group in which R is a group including —N= or —N<, and the other of the substituents $A^1$ and $A^2$, $A^3$ and $A^4$, $A^5$ and $A^6$, and $A^7$ and $A^8$ is hydrogen.

2. The optical recording medium as claimed in claim 1, wherein a nitrogen atom included in said group R in formula (I) is in a heterocyclic ring.

3. The optical recording medium as claimed in claim 1, wherein said light absorbing layer exhibits a maximum light absorption peak (λmax) in a wavelength range of 710 to 750 nm.

4. The optical recording medium of claim 1, wherein one of $A^1$ and $A^2$, one of $A^3$ and $A^4$, one of $A^5$ and $A^6$ and one of $A^7$ and $A^8$ is —OR.

5. The recording medium as claimed in claim 4, wherein R is selected from the group consisting of:

wherein $R^1$ and $R^8$ each is a bivalent aliphatic, aromatic or alicyclic hydrocarbon group; $R^2$, $R^3$, $R^4$, $R^5$, $R^6$ and $R^7$ each is a monovalent aliphatic, aromatic or alicyclic hydrocarbon group, an alkoxyl group, an alkylthio group, hydroxyl group or hydrogen, and $R^2$ and $R^3$ may form a ring in combination with nitrogen and $R^5$ and $R^6$ may form a ring in combination with carbon; and Z is a nitrogen-containing heterocyclic ring.

6. The recording medium as claimed in claim 4, wherein R is selected from the group consisting of:

$$R^1-N\begin{matrix}R^2\\ \\R^3\end{matrix}, \quad -R^1-N=N-R^4, \quad -R^1-N=C\begin{matrix}R^5\\ \\R^6\end{matrix},$$

$$-R^1-N-\overset{H}{\underset{|}{N}}-\overset{O}{\underset{\|}{C}}-R^7, \quad -R^1-\text{\textcircled{Z}}, \quad -\text{\textcircled{Z}},$$

$$-R^1-O-R^8-N\begin{matrix}R^2\\ \\R^3\end{matrix}, \quad -R^1-O-R^8-N=N-R^4,$$

$$-R^1-O-R^8-N=C\begin{matrix}R^5\\ \\R^6\end{matrix}, \quad -R^1-O-R^8-\overset{H}{\underset{|}{N}}-\overset{O}{\underset{\|}{C}}-R^7, \quad \text{and}$$

$$-R^1-O-R^8-\text{\textcircled{Z}}$$

wherein $R^1$ and $R^8$ each is a bivalent aliphatic, aromatic or alicyclic hydrocarbon group; $R^2$, $R^3$, $R^4$, $R^5$, $R^6$ and $R^7$ each is a monovalent aliphatic, aromatic or alicyclic hydrocarbon group, an alkoxyl group, an alkylthio group, hydroxyl group or hydrogen, and $R^2$ and $R^3$ may form a ring in combination with nitrogen and $R^5$ and $R^6$ may form a ring in combination with carbon; and Z is a nitrogen-containing heterocyclic ring.

7. A method of fabricating an optical recording medium comprising a substrate and a light absorbing layer formed on said substrate, said light absorbing layer comprising a metallo-phthalocyanine compound of formula (I), which comprises the steps of:

providing said light absorbing layer on said substrate by coating of said metallo-phthalocyanine compound of formula (I):

wherein M is Mn, Fe, Co, Zn or Cd; and one of the substituents $A^1$ and $A^2$, one of $A^3$ and $A^4$, one of $A^5$ and $A^6$, and one of $A^7$ and $A^8$ is an —OR group or an —SR group in which R is a group including —N═ or —N<, and the other of the substituents $A^1$ and $A^2$, $A^3$ and $A^4$, $A^5$ and $A^6$, and $A^7$ and $A^8$ is hydrogen.

8. The method of producing said optical recording medium as claimed in claim 7, further comprising the step of providing an undercoat layer between said substrate and said light absorbing layer by coating method.

9. The method of producing said optical recording medium as claimed in claim 7, further comprising the step of providing a light reflection layer on said light absorbing layer by vacuum deposition.

10. The method of producing said optical recording medium as claimed in claim 9, further comprising the step of providing a protective layer on said light reflection layer by vacuum deposition or coating method.

11. The method of claim 7, wherein one of $A^1$ and $A^2$, one of $A^3$ and $A^4$, one of $A^5$ and $A^6$ and one of $A^7$ and $A^8$ is —OR.

12. The method as claimed in claim 7, wherein R is selected from the group consisting of:

wherein $R^1$ and $R^8$ each is a bivalent aliphatic, aromatic or alicyclic hydrocarbon group; $R^2$, $R^3$, $R^4$, $R^5$, $R^6$ and $R^7$ each is a monovalent aliphatic, aromatic or alicyclic hydrocarbon group, an alkoxyl group, an alkylthio group, hydroxyl group or hydrogen, and $R^2$ and $R^3$ may form a ring in combination with nitrogen and $R^5$ and $R^6$ may form a ring in combination with carbon; and Z is a nitrogen-containing heterocyclic ring.

13. The method as claimed in claim 11, wherein R is selected from the group consisting of:

wherein $R^1$ and $R^8$ each is a bivalent aliphatic, aromatic or alicyclic hydrocarbon group; $R^2$, $R^3$, $R^4$, $R^5$, $R^6$ and $R^7$ each is a monovalent aliphatic, aromatic or alicyclic hydrocarbon group, an alkoxyl group, an alkylthio group, hydroxyl group or hydrogen, and $R^2$ and $R^3$ may form a ring in combination with nitrogen and $R^5$ and $R^6$ may form a ring in combination with carbon; and Z is a nitrogen-containing heterocyclic ring.

* * * * *

UNITED STATES PATENT AND TRADEMARK OFFICE
CERTIFICATE OF CORRECTION

PATENT NO. : 5,580,696
DATED : DECEMBER 3, 1996
INVENTOR(S) : TORU YASHIRO

It is certified that error appears in the above-identified patent and that said Letters Patent is hereby corrected as shown below:

Item [54] Abstract,　　line 1,　"and a right"

should read　--and a light--.

Signed and Sealed this

Twenty-fourth Day of March, 1998

Attest:

BRUCE LEHMAN

Attesting Officer　　　　Commissioner of Patents and Trademarks